Dec. 13, 1960 K. L. KING 2,964,662
SYNCHRONOUS INDICATOR
Filed Aug. 20, 1957
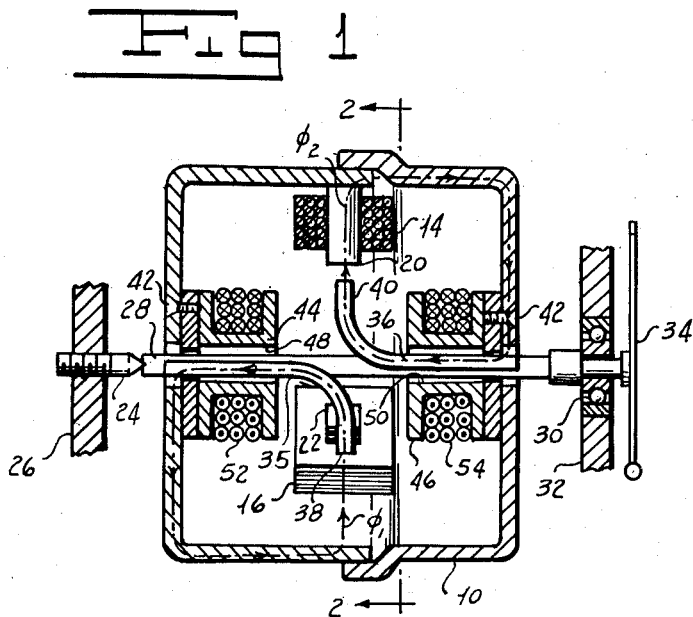
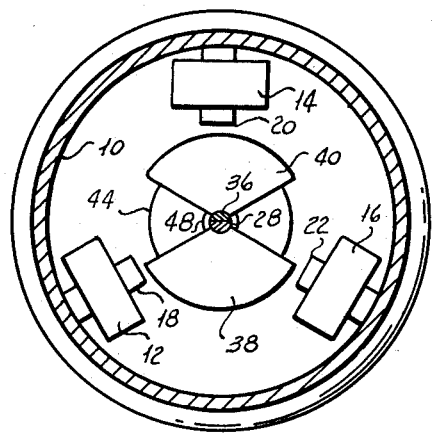
INVENTOR
KENNETH L. KING
BY
ATTORNEY United States Patent Office 2,964,662
Patented Dec. 13, 1960

2,964,662

SYNCHRONOUS INDICATOR

Kenneth L. King, Tuckahoe, N.Y., assignor, by mesne assignments, to United Aircraft Corporation, East Hartford, Conn., a corporation of Delaware Filed Aug. 20, 1957, Ser. No. 679,203

4 Claims. (Cl. 310—162)

My invention relates to a synchronous device and more particularly to an improved synchronous indicator which is simpler and which is less expensive to construct than are synchronous indicators of the prior art.

In the prior art it is well known that a synchronous receiver may be employed as an indicator. These synchronous receivers include stator windings which are energized to produce a magnetic field oriented to the direction which is to be indicated. The indicators of the prior art have a rotor carrying a winding which is energized to produce a magnetic field which interacts with the stator field to rotate the shaft to a position corresponding to the direction to be indicated. Any suitable device such as a pointer or the like carried by the rotor shaft cooperates with a dial to indicate the direction to which the rotor is oriented.

The rotor slip rings and brushes of the synchronous receivers of the prior art add considerably to the friction in the rotor and thus deleteriously affect the performance of the indicator. In addition, these slip ring and brush assemblies for energizing the rotor winding of a synchronous receiver of the prior art add to the expense of manufacturing these devices. For these reasons it will be appreciated that it is desirable to produce a synchronous receiver which does not use the brush and slip ring construction of the prior art.

I have invented a synchronous indicator which avoids the necessity for employing slip rings and brushes to energize a rotor-carried winding. My synchronous indicator has considerably less rotor friction than do synchronous indicators of the prior art. My indicator is less expensive to manufacture than are indicators of the prior art.

One object of my invention is to provide a synchronous indicator which is simpler in construction than are indicators of the prior art.

Another object of my invention is to provide a synchronous indicator which is less expensive to construct than are indicators of the prior art.

A further object of my invention is to provide a synchronous indicator which has less rotor friction than do indicators of the prior art.

Yet another object of my invention is to provide a synchronous indicator which avoids the necessity for using slip rings and brushes such as are employed in synchronous indicators of the prior art.

Other and further objects of my invention will appear from the following description.

In general my invention contemplates the provision of a synchronous indicator having a stator winding adapted to be energized to produce a magnetic field oriented to the direction to be indicated. A pair of magnetic members provide oppositely directed salient poles carried by a nonmagnetic shaft to form the rotor of my synchronous indicator. I provide a pair of stationary windings having axes coincident with the rotor shaft axis adapted to be energized to produce a magnetic field in the poles, which field polarizes the rotor of my indicator. The rotor polarizing field of my indicator interacts with the stator field to move the rotor shaft to a position corresponding to the direction to which the stator field is oriented.

In the accompanying drawings which form part of the instant specification and which are to be read in conjunction therewith and in which like reference numerals are used to indicate like parts in the various views:

Figure 1 is a sectional view of my synchronous indicator.

Figure 2 is a sectional view of my synchronous indicator taken along the line 2—2 of Figure 1.

More particularly referring now to the drawings, my synchronous indicator includes a housing 10 which supports respective stator windings 12, 14 and 16 carried by pole pieces 18, 20 and 22 secured to the casing 10 by any convenient means known to the art such as by welding or the like. I form the housing 10 from a suitable magnetic material such as steel or the like. A stud 24 screwed into a stationary support 26 provides a pivot for supporting one end of a shaft 28 formed of nonmagnetic material. A bearing 30 carried by a stationary support 32 rotatably supports the end of shaft 28 remote from the pivot pin 24. I mount a pointer 34 on the end of shaft 28 supported in bearing 30 for cooperation with a scale or the like provided on support 32 to indicate the position occupied by shaft 28.

I mount a pair of L-shaped members 35 and 36 formed of magnetic material in recesses formed in shaft 28. Any convenient means such as welding or the like may be used to secure the members 35 and 36 to shaft 28. I dispose these members 35 and 36 on shaft 28 to provide a pair of oppositely extending salient poles 38 and 40. It will be appreciated that when the stator windings 12, 14 and 16 are energized in a manner known to the art to produce a magnetic field oriented to a particular direction, this magnetic field acts on the poles 38 and 40 to align the rotor with a direction parallel to the stator field. This alignment will be either in the direction of the field or in a direction 180 degrees from the direction of the field.

I provide my synchronous indicator with means for polarizing the armature formed by poles 38 and 40 to cause the armature to align itself to the field direction and to prevent alignment of the armature with a direction opposite to the direction of the field. I employ any convenient means such as screws 42 to secure a pair of tubular cores 44 and 46 to the ends of housing 10. The cores 44 and 46 have respective openings or bores 48 and 50 through which shaft 28 extends. I dispose respective polarizing windings 52 and 54 on the cores 44 and 46 and energize these windings from the reference supply (not shown) in the same manner as the rotor windings of synchronous indicators of the prior art are energized. For purposes of clarity I have shown the conductors of windings 52 and 54 greatly enlarged in cross section in Figure 1 and have indicated one direction of current flow in these windings in which a dot in the center of the paper and a cross indicates current flow into the paper as viewed in Figure 1. With this current flow in the windings respective fluxes $\phi_1$ and $\phi_2$ flow in the directions indicated by the dot-dash lines in Figure 1. With this current flow and resultant fluxes the pole 38 becomes in effect a south pole, since the flux $\phi_1$ flows into this pole, and the pole 40 becomes in effect a north pole, since the flux $\phi_2$ flows out of this pole. It will be seen that windings 52 and 54 polarize the rotor of my synchronous indicator to permit its field to be aligned with the stator field in only the one correct direction. As a result there exists no possibility in my synchronous indicator that an ambiguous indication will be given.

In operation of my synchronous indicator I energize the stator windings 12, 14 and 16 from the stator windings of a synchronous transmitter or control transformer in a manner known to the art to cause these stator windings to produce a magnetic field oriented to a particular direction which may, for example, correspond to the position of the input shaft of the synchronous transmitter. The field of the polarized armature including poles 38 and 40 of my device interacts with the stator field to move shaft 28 to the position corresponding to the direction of orientation of the stator field. As a result of this action the pointer 34 is moved to indicate the direction of orientation of the stator field.

In alternate operation of my synchronous device as a transmitter, I energize only the polarizing field windings 52 and 54 and move pointer 34 and rotor shaft 28 to a particular direction. The rotor flux through the salient poles 38 and 40 causes voltages of certain relative magnitudes to be produced in stator windings 12, 14, and 16 according to the position of pointer 34. These voltages may be impressed on the stator windings of a synchronous receiver the shaft of which will follow the movement of pointer 34.

A complete indicator system may comprise two of my synchronous indicating devices, one as a synchronous transmitter with the rotor positioned as a command variable and generating stator voltages and the other as a synchronous receiver with the rotor correspondingly positioned as a controlled variable and supplied with stator voltages.

The gist of my invention is that a rotor polarizing winding is mounted independently of the rotor, as on the stator for example, and coaxially with the rotor shaft adjacent a magnetic portion thereof such that the rotor polarizing flux flows axially through the magnetic portion of the rotor shaft as it links the coaxial rotor polarizing winding. In synchronous indicators of the prior art the rotor polarizing winding is mounted on the rotor; the axis of the rotor polarizing winding extends radially of the rotor shaft; and the rotor polarizing flux flows radially through the rotor as it links the rotor polarizing winding. While in Figures 1 and 2 I have shown the return path for the rotor flux to be through the magnetic endbells of the stator housing 10, as will be appreciated by those skilled in the art other alternative forms of my invention may also provide a rotor polarizing winding mounted independently of the rotor and coaxially with the rotor shaft adjacent a magnetic portion thereof such that the rotor flux flows axially through the magnetic portion of the rotor shaft as it links the coaxial rotor polarizing winding.

It will be seen that I have accomplished the objects of my invention. I have provided a synchronous indicator which does not employ the slip rings and brushes required in indicators of the prior art. My indicator is simpler in construction and is less expensive to manufacture than are synchronous indicators of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is therefore to be understood that my invention is not to be limited to the specific details shown and described.

Having thus described my invention, what I claim is:

1. A synchronous device including in combination a stator, three equally spaced pole pieces carried by said stator and having end faces, respective windings carried by said pole pieces, a source of three-phase alternating voltage for energizing said windings to produce a magnetic field, a rotor comprising a shaft and a pair of radially oppositely extending salient poles, each of said rotor poles having a smooth end face subtended in angle substantially equal to the stator pole pitch whereby the magnetic cooperation between said rotor poles and stator pole pieces is through the end faces of said poles and pole pieces and means carried by said stator for producing a polarizing magnetic field in said rotor.

2. A synchronous device as in claim 1 in which said polarizing means includes respective windings and means mounting said windings on said stator coaxially with said shaft.

3. A synchronous device including in combination a stator, three equally spaced pole pieces carried by said stator and having end faces, respective windings carried by said pole pieces, a source of three-phase alternating voltage for energizing said windings to produce a magnetic field, a rotor comprising a shaft formed of non-magnetic material and a pair of integral magnetic members each having a first portion extending generally axially of the shaft and a second portion extending generally radially outwardly of the shaft to form a pair of oppositely extending salient poles, each of said second portions having a smooth end face subtending an angle substantially equal to the stator pole pitch whereby the magnetic cooperation between the rotor poles and the stator pole pieces is through said pole and pole piece end faces and means carried by said stator for producing a polarizing magnetic field in said rotor.

4. A synchronous device as in claim 3 in which said stator comprises a pair of magnetic endbells and in which said first portions extend from a point adjacent the midpoint of said shaft to a point adjacent said endbells.

References Cited in the file of this patent

UNITED STATES PATENTS 1,492,913    Wood                May 6, 1924

UNITED STATES PATENT OFFICE
CERTIFICATION OF CORRECTION

Patent No. 2,964,662  December 13, 1960

Kenneth L. King

It is hereby certified that error appears in the above numbered patent requiring correction and that the said Letters Patent should read as corrected below.

Column 4, line 18, for "subtended in" read -- subtending an --.

Signed and sealed this 2nd day of May 1961.

(SEAL)
Attest:

ERNEST W. SWIDER
Attesting Officer

DAVID L. LADD
Commissioner of Patents